United States Patent Office 3,371,004
Patented Feb. 27, 1968

3,371,004
METHOD OF ADHERING SUBSTRATES WITH POLYVINYL ALCOHOL BASED ADHESIVE
Richard J. Kennedy, Wilmington, Del., assignor to E. I. du Pont de Nemours and Company, Wilmington, Del., a corporation of Delaware
No Drawing. Filed Aug. 6, 1965, Ser. No. 477,970
2 Claims. (Cl. 156—321)

ABSTRACT OF THE DISCLOSURE

An aqueous polyvinyl alcohol adhesive composition having a viscosity of 600 c.p.s. to 5000 c.p.s. is provided. The polyvinyl alcohol is gelled by the application of heat, and the adhesive is particularly useful in the production of corrugated board. In addition to polyvinyl alcohol, the composition contains a dissolved titanium oxalate tackifier, ammonium bicarbonate tackifying catalyst, and clay.

This invention relates to a novel adhesive which has a particular use in the production of corrugated board. More especially the invention relates to a solution of a hydroxyl group containing polymeric binder which is gelled through the use of a tackifier. Gelling occurs when a pH modifying agent is liberated from a gelling catalyst on heating the same with a resulting shift of the pH value of the solution in a direction at which the tackifier functions to gel the binder.

Heretofore corrugated boards have been constructed through the use of starch-based adhesives. In operation the starch-based adhesive is applied to the corrugated medium of the board. The liner to be secured to the corrugated medium by means of the adhesive is preheated prior to being brought into contact with said adhesive coated corrugated medium. As the corrugated medium and liner are brought into contact under pressure, the heat in the liner effects a rapid increase in the viscosity of the starch solution with an attending increase in its adhesive value. The use of low melting point plastic and wax coatings on liners employed in the manufacture of corrugated boards is seriously limited by the heat which must be used to activate starch-based adhesives employed in the manufacture of corrugated boards.

It is an object of this invention to provide a novel adhesive which requires so little heat to activate the same as to enable those skilled in the art to use wax and plastic coated liners of all descriptions. It is further an object of this invention to provide an adhesive which has sufficient "quick tack" or "green strength" so as to enable the adhesive to be employed with corrugating machines operating at maximum speeds.

These and other objects are fully attained by the present invention which still more specifically comprises an adhesive composition containing clay as an inert filler, polyvinyl alcohol as the hydroxyl group containing polymeric binder, a titanium oxalate complex tackifier, and ammonium bicarbonate as a gelling catalyst. In use the adhesive solution of polyvinyl alcohol, titanium oxalate complex, and ammonium bicarbonate has an initial pH of up to about 6, and gels on adjusting its pH to at least about 7.

The term "polyvinyl alcohol" refers to the water soluble products obtained by the complete or partial alcoholysis or hydrolysis of polyvinyl esters such as polyvinyl acetate. Complete alcoholysis or hydrolysis indicates that 99–100% of the acetate or carboxylate groups of the polyvinyl ester have been replaced by hydroxyl groups. Partial alcoholysis or hydrolysis indicates that 50–99% of the ester groups have been replaced by hydroxyl groups. The polyvinyl alcohols preferred in the present invention are low molecular weight, fully hydrolyzed grades having 4% aqueous solution viscosities of from 5–15 centipoises. This grade has the following advantages:

(1) forms stable complexes with titanium oxalate
(2) forms high solids solutions at high binder/filler levels (min. 0.35 ratio) while maintaining low viscosities for good on-machine performance.

"Elvanol 70–05" is an example of a polyvinyl alcohol of the preferred grade.

Other grades or types of polyvinyl alcohol varying in the degree of hydrolysis, molecular weight, solubility, etc., can be employed successfully in the practice of this invention but they do not exhibit to the same degree as the preferred grade certain desirable characteristics among which are water sensitivity, adhesive properties, rate of reaction with titanium oxalate and solution characteristics. Relative higher molecular weight polyvinyl alcohols having viscosities of from 1–35 c.p.s. (4% aqueous solution) can also be used. "Elvanol 71–30" is an example of this grade of polyvinyl alcohol. Still other polyvinyl alcohols can be used such as "Elvanol 73–125" which, as its name indicates, forms a 4% aqueous solution having a viscosity of 125 c.p.s.

The tackifiers used in this invention are titanium compounds wherein titanium is in the valence state of +4 and are complexed with oxalate radicals (including binoxalate radicals), and usually other ions, radicals, and hydrogen bonded water molecules. One suitable titanium oxalate complex which is commercially available is potassium titanium oxalate complex which may be represented by the empirical formulation $K_2Ti(OH)_2 \cdot (C_2O_4)_2 \cdot H_2O$. Obviously, the titanium oxalate complex must be soluble in the aqueous polyvinyl alcohol solution, at least in the concentrations necessary to effect substantial subsequent gelation, and should be stable in water solution, preferably even up to the boiling point, without decomposition and precipitating titanium hydroxide.

The preferred gelling catalyst of this invention is ammonium bicarbonate. The compound is neutral in solution and liberates ammonia on decomposing at low temperatures reported in the range of from about 97° to 140° F. Ammonium bicarbonate is typical of those compounds which decompose at low temperatures to liberate a base.

Preparation of the novel adhesive has been obtained in the following manner. A blended dry mix of clay, polyvinyl alcohol and potassium titanium oxalate complex is added to approximately 75 percent of the required amount of water contained in a suitable vessel. A brisk mechanical agitation accompanies the addition of the blended mix. The temperature of the water at this point is slightly above or below room temperature. After a smooth slurry has been obtained, "live" steam is introduced below the liquid surface at a fairly rapid rate. In 15–50 minutes, the temperature of the adhesive slurry will approach 140–150° F. at which point a significant decrease in viscosity occurs. Steam is continued until the temperature reaches 185°–190° F. at which time the steam is removed and agitation is continued for an additional 15–20 minutes. After the adhesive has cooled sufficiently (at least 120° F.), an aqueous solution of the gelling catalyst (ammonium bicarbonate) is added to the slurry with brisk agitation. The temperature of the resulting slurry must not be of a value such that the ammonium bicarbonate decomposes and should preferably be less than 97° F. Adhesive viscosity is measured by means of a Brookfield Model LVF Synchro-lectric viscometer and adjusted with the addition of water until the desired viscosity is attained. Viscosity values of from 2,000 to 4,000 c.p.s. measured at 100° F. and 20 r.p.m. have excellent adhesive application properties. Viscosity values of from 600 to 5,000 c.p.s. as measured above constitute the range of viscosity values which can be tolerated. The viscosity value of the adhesive should be as high as can be applied without difficulty. High viscosity adhesives provide a basis from which the very high viscosity values necessary to provide "quick tack" can be more readily achieved.

The clay mentioned above is an inert filler. The inert filler is added to the adhesive to reduce adhesive penetration into the corrugated medium and liner and to improve the general performance of the adhesive. Excessive adhesive penetration is avoided when the filler is present in the amount of about 50% by weight of the adhesive. In addition to this function, the clays preferably employed adjust the pH of the solution to the acidic side. Approximately 3 parts of clay are present for every part of polyvinyl alcohol. Here it should be noted that the ratio of polyvinyl alcohol to filler decreases with the use of polyvinyl alcohol having increased viscosity values. For example, a polyvinyl alcohol to filler ratio of 0.35 is excellent when using "Elvanol 70–05." Ratios of 0.30 and 0.28 respectively are used with "Elvanol 71–30" and "Elvanol 73–125" respectively. The ratio range of 0.33 to 0.37 is preferred with values as low as 0.28 being within the scope of this invention. The percentage of solids present in the adhesive can vary between 25% and 50% with a higher solids percentage being used with the lower molecular weight polyvinyl alcohols. Other inert filler may be employed as desired and in some instances, the use of acids and salts of strong acids or other pH modifying ingredients may be required. ASP–200 clay is the preferred filler. Minor amounts of other ingredients are present and their functions are set forth in the footnotes of tables which appear hereinafter.

A test for "quick tack" strength has been developed which is related to adhesive performance at the single-facer section of a commercial corrugator. The test involves the following steps:

(1) a sheet of corrugating medium (33 lb. basis weight, 3″ x 6″ and 0.009″ thick) is affixed to a sheet of aluminum (4″ x 6″) by means of double-faced masking tape.

(2) a separate piece of equipment, termed the "stamp" is prepared by affixing a sheet of liner (42# basis weight, 0.012″ thick, 3″ x 6″) to a sheet of aluminum by means of double-faced masking tape. An aluminum rod (¼″ dia.) is attached at right angles as a handling.

(3) the "stamp" is heated on a hot plate until the liner has attained a temperature of 240–260° F.

(4) a thin film of adhesive (0.015″ wet) is applied by means of a Mayer rod so as to cover the area of 3″ x 6″.

(5) at this point, the "hot" stamp is immediately brought into contact with the adhesive coated medium and the entire assembly is raised to a height of 12 inches where it must remain intact for 3 seconds.

By varying the weight of the aluminum sheet which is to be lifted, "quick tack" strengths ranging from 2.7 to 10.1 gms./cm.$^2$ can be measured. To a certain extent, adhesive performance, as relates to the capacity to form paper/paper bonds at machine speeds in the range of 200–550 f.p.m. is related to "quick tack" strength. For example, an adhesive with a "quick tack" strength of 2.7 gms./cm.$^2$ will perform satisfactorily at 150–200 f.p.m. but will not produce acceptable board at the higher speeds. "Quick tack" strengths must be in the 5–8 gm./cm.$^2$ range for machine speeds of 500 f.p.m.

The results of "quick tack" strength measurements on a series of polyvinyl alcohol based adhesives are reported in Table I. It can be seen in the case of adhesive A characterized by an absence of ammonium bicarbonate that the gellation reaction between titanium oxalate and polyvinyl alcohol does not occur, even under heat activation conditions, and only a low "quick tack" strength is obtained. With adhesives B and C, which contain the heat-activated gelling system, significantly improved "quick tack" strengths are obtained when "hot" liner is employed. The "quick tack" strengths are more than adequate for machine speeds in excess of 500 feet per minute.

TABLE I.—HEAT ACTIVATED POLYVINYL ALCOHOL BASED ADHESIVES [a]

|  | A | B | C |
|---|---|---|---|
| Binder and Filler: "Elvanol" 70–05/ASP–200 clay | 0.3 | 0.3 | 0.35 |
| Tackifier: Percent K titanium oxalate (on PVA) [b] | 6.0 | 6.0 | 4.3 |
| Gelling Catalyst: Percent NH$_4$HCO$_3$ (on titanium oxalate) | ---- | 5.0 | 5.0 |
| Plasticizer: Percent Dimethyl phthalate (on PVA) [c] | 10.0 | 10.0 | 10.0 |
| Surfactant: | | | |
| Percent Igepal CO–710 (on PVA) [d] | 0.6 | 0.3 | 0.3 |
| Solids | 42.3 | 45.5 | 41.5 |
| pH | =5.0 | 4.9 | 5.2 |
| Viscosity, M c.p.s. (100° F.): [e] | | | |
| 10 r.p.m. | 1.20 | 10.00 | 5.50 |
| 20 r.p.m. | 1.00 | 7.00 | 4.60 |
| 50 r.p.m. | 0.70 | 4.40 | 3.26 |
| 100 r.p.m. | 0.55 | 3.40 | 2.50 |
| "Quick tack" strength, gms./cm.$^2$: [f] | | | |
| "Hot" (250° F.) liner | <2.7 | >10.1 | 10.1 |
| "Cold" (25° F.) liner [g] | ---- | 2.7–4.2 | 4.2–5.6 |

[a] Medium—semichemical, 33 lb. basis wt., 0.009 thickness, W. Va. Pulp Liner; kraft, 42 lb. basis wt. 0.012″ thickness W. Va. Pulp.
[b] Potassium titanium oxalate K$_2$Ti(OH)$_2$(C$_2$O$_4$)·H$_2$O.
[c] Added initially to improve adhesive flexibility, it appears also to prevent "skinning" and mold formation and to improve adhesive "wetting" on the glue applicator roll.
[d] Nonionic manufactured by Antara (Allied). Nonylphenoxy poly (ethyleneoxy) ethanol.
[e] Viscosity, No. 6 spindle, Brookfield.
[f] "Hot" liner—in the "quick tack" test, liner is preheated to 250–300° F. before bonding.
[g] "Cold" liner=liner at room temperature.

The commercial utility of the adhesives of this invention were demonstrated on a pilot single-facer at machine speeds as high as 500 f.p.m. The results of these trials are summarized in Table II.

Adhesives D and E based on "Elvanol 70–05," the preferred polyvinyl alcohol for the adhesives, contained the heat activated gelling system based on titanium oxalate and ammonium bicarbonate and exhibited good "quick tack" at machine speeds exceeding 500 f.p.m. In addition, no problems, i.e., premature gellation, were encountered in the application of these adhesives.

TABLE II.—PILOT SINGLE-FACER EVALUATION STUDIES [a]

|  | D | E |
|---|---|---|
| Binder: "Elvanol" 70–05 polyvinyl alcohol (lbs.) | 9.4 | 9.4 |
| Filler: ASP–200 clay (lbs.) | 31.3 | 27 |
| Plasticizer: Dimethyl phthalate (gms.) | 427 | 427 |
| Tackifier: Potassium titanium oxalate (gms.) | 257 | 257 |
| Surfactant: "Igepal" CO–710 (gms.) | 27.2 | 27.2 |
| Gelling Catalyst: | | |
| NH$_4$HCO$_3$ (gms.) [b] | 12.85 | 12.85 |
| PVA/Clay | 0.3 | 0.35 |
| Tackifier/PVA×100 | 6 | 6 |
| Gelling catalyst/Tackifier×100 | 5 | 5 |
| Solids, percent | 42 | 41.3 |
| Viscosity: | | |
| Temp.° F | 100 | 120 |
| 20 r.p.m. (c.p.s.) | 4,000 | 2,000 |
| Wiper (in.) [c] | 0.004 | 0.006 |
| Quick Tack: | | |
| 200 f.p.m. | Good | Good |
| 300 f.p.m. | Good | Good |
| 500 f.p.m. | Good | Good |
| Glue Pattern: | | |
| 200 f.p.m. | Good | Good |
| 300 f.p.m. | Good | Good |
| 500 f.p.m. | Good | Good |

[a] Substrates—medium: 33 lb. basis wt. 9 pt. (I.P.C.): Liner, 52 lb. basis wt. Kraft (IPC).
[b] NH$_4$HCO$_3$—dilute aqueous solution added to "cold" (100° F.) adhesive to prevent premature gellation.
[c] Wiper: clearance between applicator roll and doctor roll of corrugating machine.

The preferred method of using the novel adhesive described heretofore is set forth and the description of its use in a corrugating machine. Broadly, the method comprises preparing the adhesive and applying it to one substrate in a cooled or non-heated condition and thereafter bringing a second preheated substrate into contact with the adhesive coated substrate. It is within the scope of this invention to assemble two substrates by the use of the adhesive and to thereafter heat the same to provide an article immediately ready for use.

Having described various embodiments of our invention, for purposes of illustration rather than limitation, what we claim is as follows:

1. The method of adhering substrates which comprises applying to a first substrate a solution having a pH at least as low as about 6 and consisting essentially of a water soluble dissolved titanium oxalate complex, wherein titanium is in the +4 valence state, ammonium bicarbonate and polyvinyl alcohol, and contacting said solution applied first substrate with a heated second substrate.

2. The method of adhering substrates which comprises applying to a first substrate a solution having a pH at least as low as about 6 and consisting essentially of a water soluble dissolved titanium oxalate complex, wherein titanium is in the +4 valence state, ammonium bicarbonate and polyvinyl alcohol, contacting said solution applied first substrate with a second substrate and heating the solution.

References Cited

UNITED STATES PATENTS

| | | | |
|---|---|---|---|
| 3,318,856 | 5/1967 | Deyrup | 260—91.3 |
| 2,892,731 | 6/1959 | Claxton | 260—29.6 |
| 2,938,812 | 5/1960 | Marzocchi et al. | 260—91.3 |
| 3,258,442 | 6/1966 | Sinclair | 260—29.6 |

MURRAY TILLMAN, *Primary Examiner.*

W. J. BRIGGS, *Assistant Examiner.*